United States Patent
Khan et al.

(10) Patent No.: US 8,033,521 B2
(45) Date of Patent: Oct. 11, 2011

(54) BOTTOM PANEL FOR TRANSPORT REFRIGERATION UNIT

(75) Inventors: Shafi N. Khan, Cicero, NY (US); Franklin A. Miller, Jr., North Syracuse, NY (US)

(73) Assignee: Carrier Corporation, Farmington, CT (US)

( * ) Notice: Subject to any disclaimer, the term of this patent is extended or adjusted under 35 U.S.C. 154(b) by 564 days.

(21) Appl. No.: 12/279,931

(22) PCT Filed: Feb. 24, 2006

(86) PCT No.: PCT/US2006/006692
§ 371 (c)(1),
(2), (4) Date: Aug. 19, 2008

(87) PCT Pub. No.: WO2007/106066
PCT Pub. Date: Sep. 20, 2007

(65) Prior Publication Data
US 2010/0224754 A1     Sep. 9, 2010

(51) Int. Cl.
*F16M 13/00* (2006.01)
*A47F 5/00* (2006.01)
*B60H 1/32* (2006.01)

(52) U.S. Cl. ............. 248/672; 248/309.1; 248/673; 62/239; 62/263; 296/24.35

(58) Field of Classification Search ........... 248/311.2, 248/346.01, 646, 672, 678, 309.1, 673; 62/239, 62/244, 275, 263, 261; 293/154, 117; 296/180.4, 296/24.35, 186.1, 186.3; D23/325
See application file for complete search history.

(56) References Cited

U.S. PATENT DOCUMENTS

| 4,078,395 | A | * | 3/1978 | Crowe et al. ............ 62/239 |
| 4,348,871 | A | | 9/1982 | Androff |
| 4,365,484 | A | * | 12/1982 | Carson et al. .......... 62/239 |
| 4,551,986 | A | | 11/1985 | Anderson et al. |
| 4,736,597 | A | | 4/1988 | Anderson et al. |
| D318,107 | S | * | 7/1991 | Allard et al. ........ D23/325 |
| D323,552 | S | * | 1/1992 | Baldwin et al. ....... D23/325 |

(Continued)

FOREIGN PATENT DOCUMENTS

EP     0967116 A2     12/1999

OTHER PUBLICATIONS

Extended European Search Report mailed Dec. 4, 2009 (3 pgs.).

(Continued)

*Primary Examiner* — Tan Le
(74) *Attorney, Agent, or Firm* — Cantor Colburn LLP

(57) ABSTRACT

Provision is made for a single person to easily install a bottom panel for the cover of a transport refrigeration unit. A plurality of forwardly extending tabs are spaced on a rear frame member and corresponding pockets with horizontal slots are similarly spaced near the rear edge of the bottom panel. The bottom panel is then advanced such that the tabs fit into the slots, and then the front portion of the bottom panel is attached to the framework by a plurality of fasteners passing through front pockets of the bottom cover and into L-shaped brackets mounted on a front portion of the frame. The bottom panel is preferably formed of a thermoplastic olefin material that provides flexibility for ease of assembly but is sufficiently rigid and strong and exhibits good sound absorbing characteristics.

16 Claims, 6 Drawing Sheets

U.S. PATENT DOCUMENTS

| | | |
|---|---|---|
| 5,960,637 A | 10/1999 | Stevens et al. |
| D419,229 S * | 1/2000 | Stevens et al. ............... D23/325 |
| 6,206,439 B1 * | 3/2001 | Kiefer et al. .................. 293/121 |
| D454,625 S * | 3/2002 | Flanagan ..................... D23/325 |
| 6,497,112 B1 | 12/2002 | Simeone et al. |
| 6,907,747 B2 | 6/2005 | Laizer |
| D554,544 S * | 11/2007 | Englert et al. ................. D10/49 |
| 7,406,834 B2 * | 8/2008 | Williams ....................... 62/115 |

OTHER PUBLICATIONS

International Search Report and Written Opinion mailed Aug. 11, 2008 (8 pgs.).

International Preliminary Report on Patentability mailed Sep. 18, 2008 (5 pgs.).

* cited by examiner

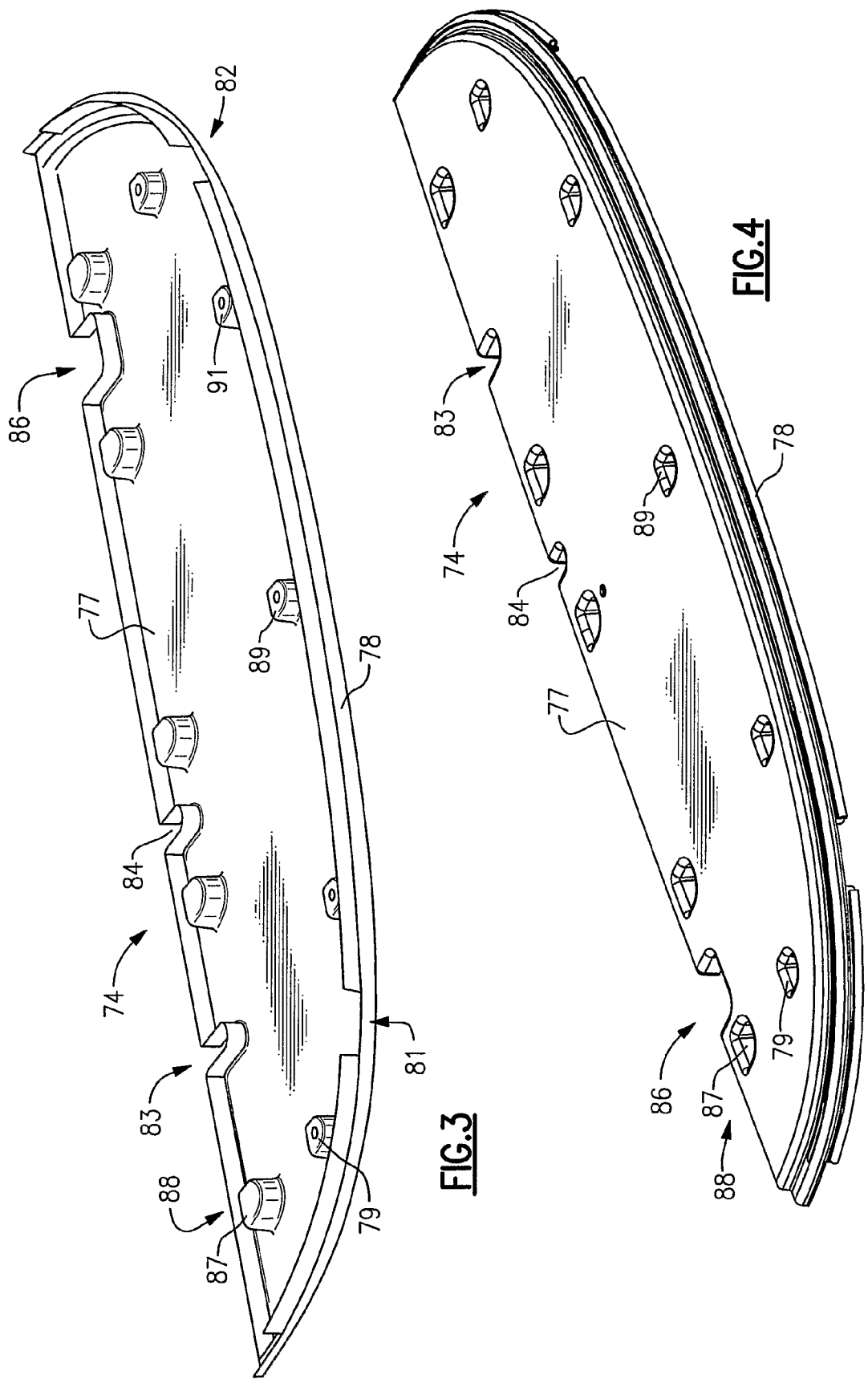

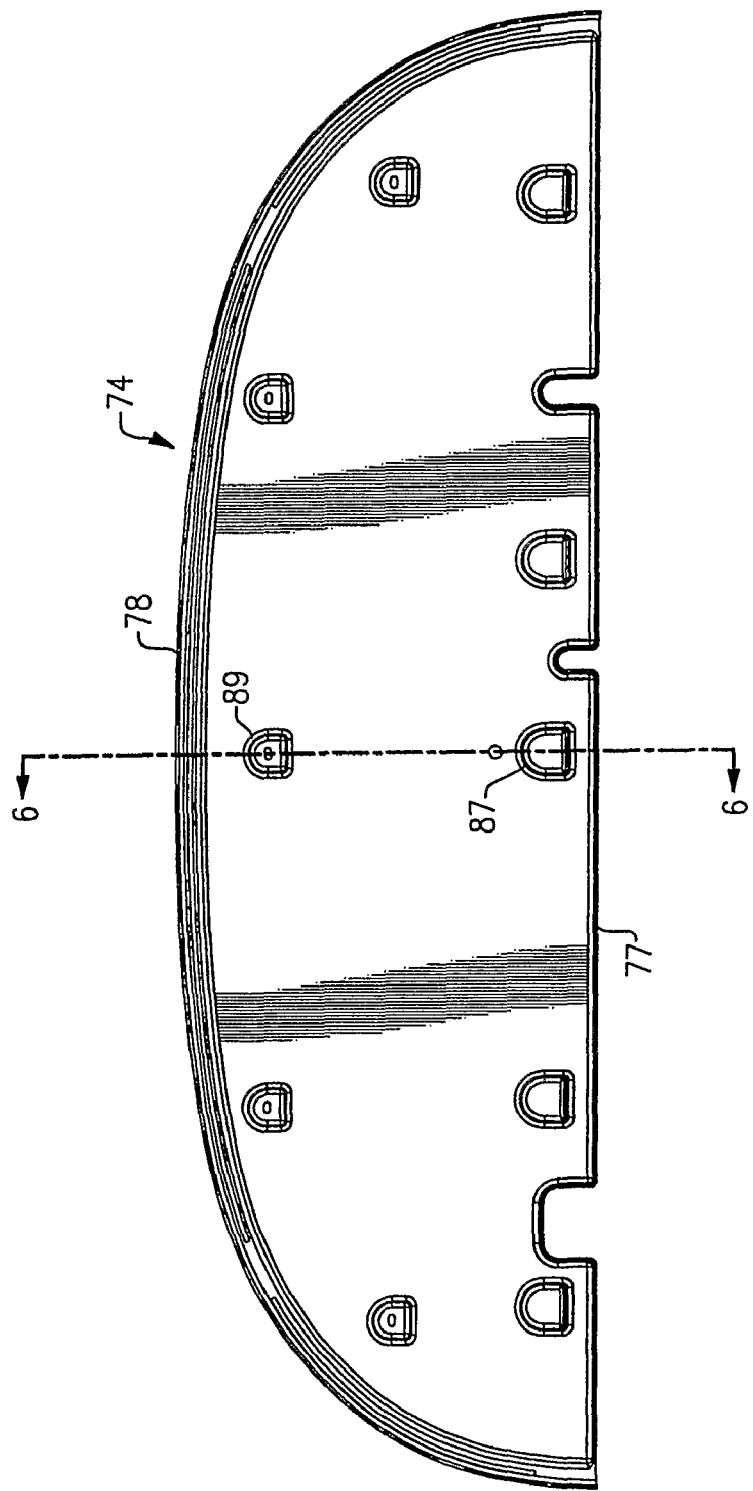

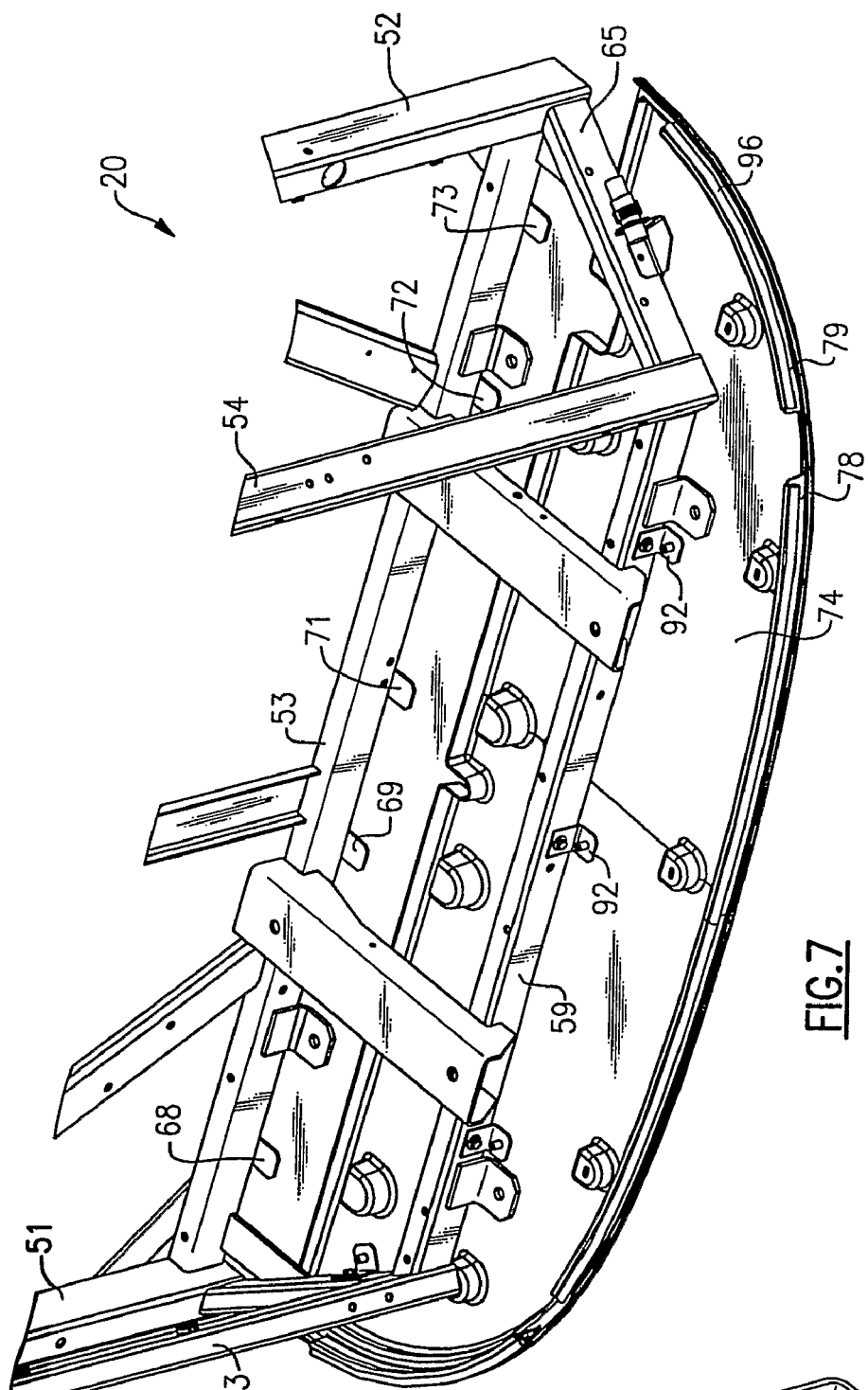
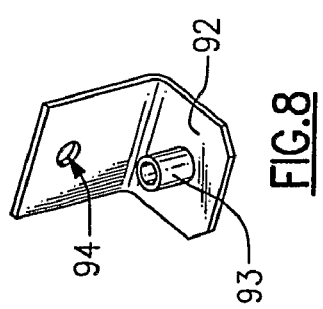
FIG.7
FIG.8

BOTTOM PANEL FOR TRANSPORT REFRIGERATION UNIT

FIELD OF THE INVENTION

The present invention relates generally to the art of transport refrigeration units and in particular to outer protective covers for such units.

BACKGROUND OF THE INVENTION

A typical transport refrigeration unit of the type designed for mounting on the front face of a tractor trailer unit comprises a one piece, self-contained fully refrigerant charged, prewired, refrigerant/heating unit powered by a diesel engine. In such a design the evaporator fits into a rectangular opening in the upper portion of the trailer front wall. When installed, the evaporator section is located inside the trailer; and the condensing section is outside and on the front of the trailer. The condensing section consists of an engine-compressor drive package, condenser fan, condenser coil, radiator coil, control panel, relay module, refrigerant controls, piping, wiring and associated components.

Structural frame means support all of the components and facilitate attaching of the unit to the trailer front face. Also supported by the structural framework is an outer cover which includes the necessary air inlet and outlet openings for cooling, and which may be opened to provide access to the interior of the unit for maintenance and service.

Such refrigeration units preferably have a bottom panel to hide components, wiring, and the like and to improve aesthetics of the underside of the unit. Traditionally this has been provided in the form of a two piece bottom panel that was secured to the underside by way of fasteners. For the assembly of such a panel, it was necessary to have one person holding the panels in place while another person secured them to the bottom by way of fasteners.

A bottom cover should not only be simple in construction with as few parts as possible but should also be easy to assemble, be of lost cost and weight, while at the same time providing superior appearance and reliability.

SUMMARY OF THE INVENTION

In accordance with one aspect of the invention, a bottom panel for a transport refrigeration unit is a unitary member which can be easily attached to the frame of the unit by a single installer placing the panel in position and securing it by fasteners.

By another aspect of the invention, the unit frame has a plurality of horizontally extending tabs attached thereto and the bottom cover has a plurality of matching slots near the rear edge thereof. The cover is easily installed by placing the bottom cover in position with the slots registering with the frame tabs and then securing the cover in position with fasteners near its front edge.

In accordance with another aspect of the invention, the unit frame also includes a plurality of mounting angles that are fastened to the front portion of the frame with the mounting angles being adapted to receive fasteners therein. The bottom cover is then placed under the mounting angles and secured thereto by way of fasteners.

By yet another aspect of the invention, the bottom cover panel is formed of a thermoplastic olefin material.

In the drawings as hereinafter described, a preferred embodiment is depicted; however, various other modifications and alternate constructions can be made thereto without departing from the true spirit and scope of the invention.

BRIEF DESCRIPTION OF THE DRAWINGS

FIG. 3 is a perspective view of the cover bottom panel as seen from above in accordance with the present invention.

FIG. 4 is a perspective view of the cover bottom panel as seen from below in accordance with the present invention.

FIG. 5 is a top view of the bottom panel in accordance with the present invention.

FIG. 6 is a sectional view thereof as seen along lines 6-6 of FIG. 5.

FIG. 7 is an exploded view of the unit frame and cover bottom panel.

FIG. 8 is a perspective view of a mounting bracket in accordance with one aspect of the invention.

DETAILED DESCRIPTION OF THE PREFERRED EMBODIMENT

Figure 1:
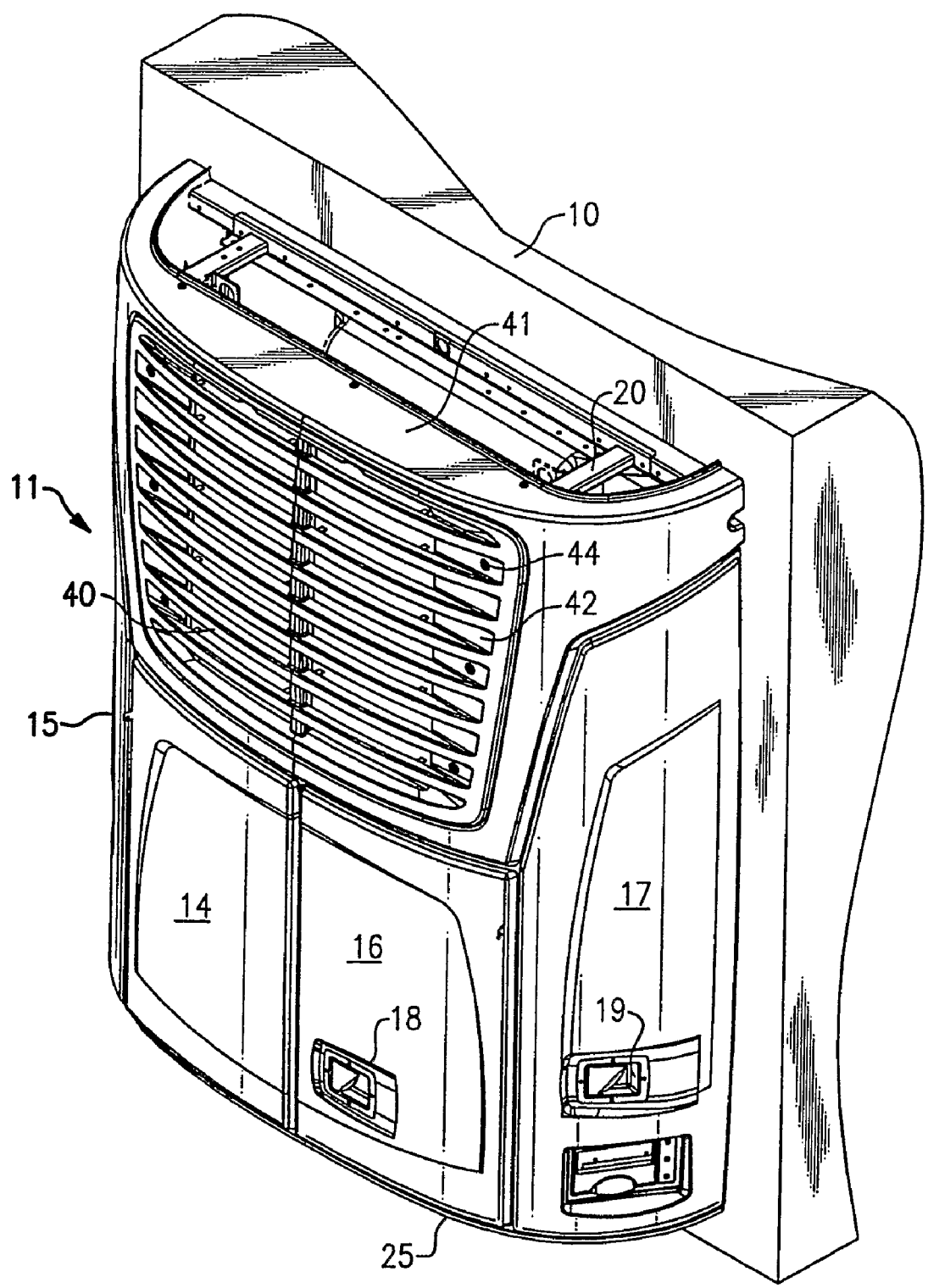
FIG. 1 is a perspective view of a transport refrigeration unit with the present invention incorporated therein.

In FIG. 1 a fragmentary front part of a large transport trailer 10 is shown with a transport refrigeration unit 11 mounted on the front wall 12 of the trailer. For purposes of the present description the terms "roadside" and "curbside" will be used in describing various components of the refrigeration unit and its cover. As viewed in FIG. 1, the right hand side of the unit will be referred to as the roadside and the left hand side of the unit as the curbside of the unit.

With this reference, the unit as illustrated in FIG. 1 has the curbside front door 14, and, the roadside front door 16 of the unit cover in their closed positions but containing the inner structural components of the unit as well as some of the components of the refrigeration unit itself. Attachment of the refrigeration unit 11 to the trailer 10 is carried out by connection of an outer peripheral planar structural steel framework illustrated generally by reference numeral 20. It should be appreciated that this framework is not normally visible when the unit is properly installed on a trailer unit, however for purposes of illustration, at least a portion of the structural framework is illustrated in FIG. 1.

All of the component assemblies which define the outer cover of the refrigeration unit 11 are mounted to the various structural components. Each of the doors forming the lower portion of the cover are made from a tough, light-weight composite material designed to resist rust, denting, warping, fading or peeling of their outer finish. These components include the front curbside door 14 and the front roadside door 16 previously referred to above. They also include the curbside outer door 15 and roadside outer door 17.

The front doors 14 and 16 are vertically hinged at their respective outer edges to provide a large access opening at the front of the unit. The side doors 15 and 17 are vertically hinged at their rear edges such that they pivot open from front to back. Latches 18 and 19 are provided for latching and unlatching the front roadside door 16 and side roadside door 17, respectively.

The upper part of the unit cover comprises a rigid front grille member 40 and a flexible support structure 41 disposed in surrounding relationship therewith. The grille member 40 is positioned in overlying relationship with the condenser heat exchanger of the refrigeration unit and is provided with a large number of openings 42 therethrough to facilitate air flow for efficient heat transfer. The support member 41 is secured to the frame 20 and the front grille is fastened to the support structure 41 by appropriate fastening means as at 44.

A cover bottom panel 25 is attached to the unit in a manner to be described hereinafter.

It will be appreciated therefore that the door and grille components, as well as the cover bottom panel, as described above are designed to cooperate to fully enclose the refrigeration unit 11 to provide protection from the environment and road hazards and to aerodynamically and aesthetically enhance the unit.

Figure 2:
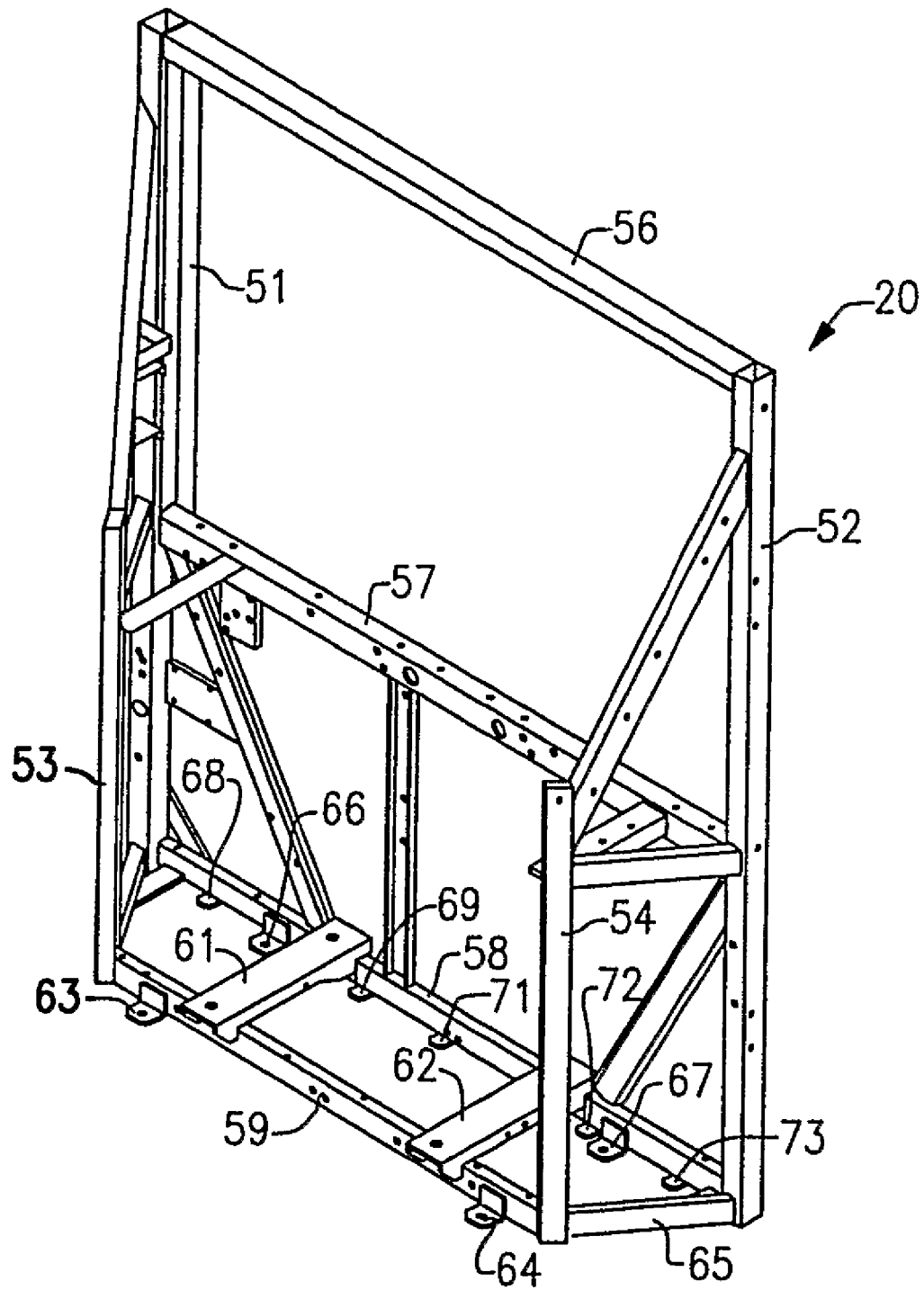
FIG. 2 is a perspective view of the framework for a trailer refrigeration unit in accordance with the present invention.
Figure 9:
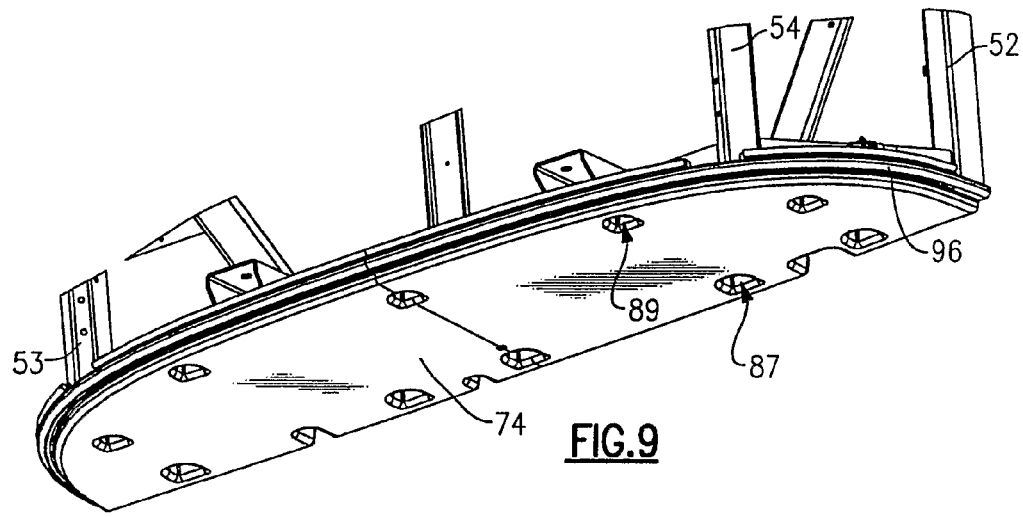
FIG. 9 is a perspective view of the installed bottom panel as seen from below.
Figure 10:
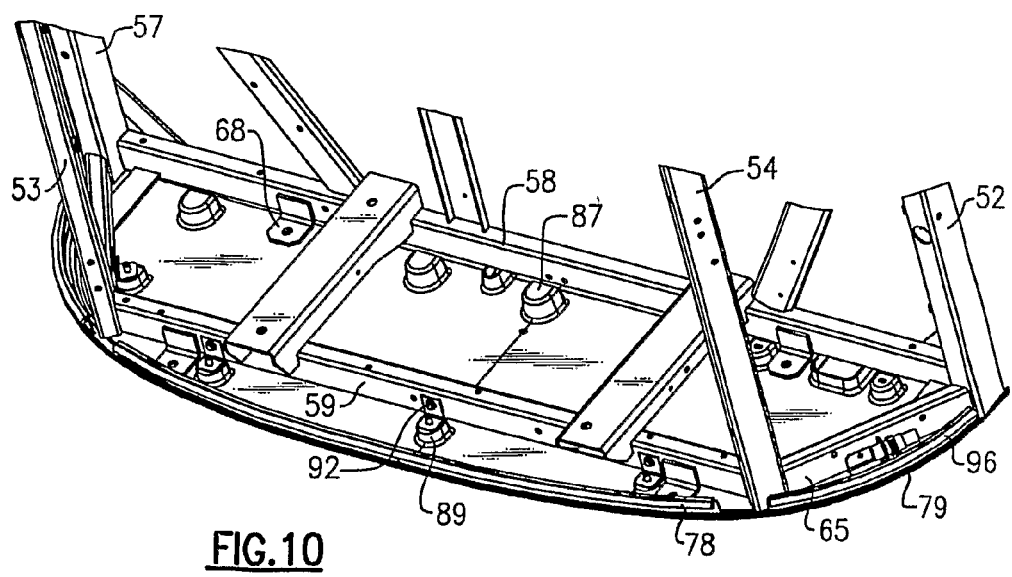
FIG. 10 is a perspective view of the installed bottom panel as seen from above.

Referring now to FIGS. 2-10, the features of the cover bottom panel 25 and the manner in which it is attached will now be described. Referring to FIG. 2, the steel structural framework for attaching the transport refrigeration unit 11 and its cover to the front wall 12 of the trailer is shown at 20. Its components include the rear vertical members 51 and 52, front vertical members 53 and 54, rear horizontal members 56, 57 and 58, and a front horizontal member 59, all of which are secured together to form a rigid framework. Interconnecting the rear horizontal member 58 and the front horizontal member 59 are the horizontal tie members 61 and 62.

Secured, by welding or the like, to the front face of the front horizontal member 59 are L-brackets 63 and 64. Similarly, L-brackets 66 and 67 are secured to the front face of the rear horizontal member 58 as shown. Each of the L-brackets has a hole formed in the extended leg for purposes of securing the frame 20 to a pallet. Thus, they are not related to the present invention.

Also attached to the rear horizontal member 58 are the forwardly extending tabs 68, 69, 71, 72 and 73 as shown. The purpose of these tabs is to provide an easy and effective method of attaching the bottom cover to the framework 20 in a manner to be described hereinafter.

The bottom panel, to be attached to the framework 20 to form the bottom portion of the outer cover for purposes of closure and to improve the aesthetics of the underside of the unit, is shown at 74 in FIGS. 3-6, with FIG. 3 being a top perspective view, FIG. 4 being a bottom perspective view, FIG. 5 being a top view and FIG. 6 being a sectional view thereof. The panel 74 comprises a planar member 76 having a straight rear edge 77 and a curved front edge 78 as shown. An upwardly extending ridge 79 is disposed around the rear and front edges 77 and 78 to provide an interface with the other portions of the outer cover. For example, the ridge 79 on the front edge 78 interfaces with the lower edge of the access doors of the cover. As it will be seen, there are spaces 81 and 82 in which the ridge 79 does not extend, since these are the spaces between the respective front and side doors.

At the rear edge 77 of the panel there are provided three indentions 83, 84 and 86 which allow for the insertion of wire harnesses.

Located near the rear edge 77 are five identical pockets 87 which extend upwardly from the planar member 76 in a generally cylindrical manner. In the rear side of each of the pockets is a slot 88 that extends forwardly into the pocket 87. This can best be seen in the cross sectional view of FIG. 6. The purpose of these pockets 87 and slots 88 is to facilitate the attachment of the panel 74 to the frame 20 in the manner to be described hereinafter.

Located near the front edge 78 of the panel 74 are five identical pockets 89 extending upwardly from the planar member 76 in a generally cylindrical manner and having an opening 91 centrally disposed therein. A cross sectional view thereof is shown in FIG. 6. The purpose of these pockets 89 are to facilitate the attachment to the frame 20 by way fasteners in the manner to be described hereinafter.

The bottom panel 74 is a one-piece injection molded part which is sufficiently flexible to allow for easy assembly with the frame 20, but also provide sufficient rigidity and strength to provide a robust and durable undercover for the unit. A preferred material is a thermoplastic olefin (TPO). Another olefinic material may also be used. One advantage of such a material, in addition to its strength and flexibility, is that it provides excellent damping characteristics as compared with a metallic member or a rigid thermoplastic/thermoset material, and the need for additional sound/foam installation is not required.

Referring now to FIGS. 7-10, the manner in which the bottom panel 74 is attached to the frame 20 will now be described. Provision is first made for attachment of the bottom panel 74 to the front horizontal member 59 of the frame 20. This is accomplished by attaching five L-shaped brackets 92 to the framework 20. The L-shaped brackets 92 are shown in FIG. 8 and include an integrally attached, upstanding cylinder 93 in the lower leg and a hole 94 in the upper leg. The hole 94 is for purposes of attaching the bracket 92 to the framework, and the cylinder 93 is used for attachment of the bottom panel 74 to the brackets 92.

As will be seen in FIG. 7, three of the brackets 92 are attached to the front face of the front horizontal member 59 by way of fasteners passing through the hole 94. The other two brackets 92 are attached, one each, to each of the diagonal members 65, but on the inner surface thereof. We are now ready to attach the bottom panel 74 to the framework 20.

First a bubble gasket 96 is placed on the upwardly extending edge 79 of the panel front edge 78. This is accomplished by U-clipping it over the ridge 79 and provides for an improved interface with the lower edges of the doors that interface therewith.

A single person assembly of the panel 74 to the frame 20 can then be made by registering the slots 88 of the covers 74 over the tabs 68 on the rear horizontal member 58 of the frame. The slots 88 are of sufficient size to provide easy registry with the tabs 68-73, while at the same time providing a relatively tight fit when in the installed position. The TPO material is very suitable for this purpose.

The next step is to align the pockets 89 with the L-shaped brackets 92 such that fasteners can be passed through the opening 91 in the pockets 89 and then engage with the inner surface of the cylinder 93 to fixedly secure the bottom cover 74 in place. The bottom cover 74 is shown in its installed condition in FIGS. 9 and 10.

We claim:

1. A transport refrigeration unit of the type adapted to be mounted on the front wall of a trailer for conditioning the interior of the trailer, the unit having a structural frame with includes a section to be attached to the trailer and support members spaced from the front of the trailer for supporting front and bottom covers for enclosing the refrigeration unit, wherein the support and bottom cover comprise:

a rear horizontal support member having a plurality of laterally spaced tabs extending forwardly therefrom;

a front horizontal support member disposed substantial parallel to said rear horizontal support member;

a bottom, generally planar, cover having front and rear edges;

a plurality of upstanding pockets disposed near said rear edge, with each pocket having a slot formed in the back thereof, said pockets being transversely spaced at substantially the same spacing as said tabs such that each of said tabs is registered within a slot so as to support said cover at its rear edge;
a plurality of fastening pockets disposed near said front edge; and
a plurality of fasteners for securing said fastening pockets to said front frame member.

2. A transport refrigeration unit as set forth in claim 1 wherein said planar cover is composed of a plastic material.

3. A transport refrigeration unit as set forth in claim 2 wherein said plastic material is a thermoplastic olefin.

4. A transport refrigeration unit as set forth in claim 1 and including a pair of obliquely extending support members for interconnecting the respective ends of said rear horizontal support member and said front horizontal support member.

5. A transport refrigeration unit as set forth in claim 1 and including a plurality of L brackets secured to a front face of said front frame member and extending forwardly therefrom and further wherein said fasteners secure the fastening pockets to said L brackets.

6. A transport refrigeration unit as set forth in claim 4 and including an L bracket attached to a rear face of each one of said obliquely extending support members, and further wherein one of said fastening pockets is attached to each one of said L brackets.

7. A transport refrigeration unit as set forth in claim 1 wherein said bottom cover includes an upstanding ridge formed on said front and rear edges.

8. A transport refrigeration unit as set forth in claim 7 and including a gasket installed in overlapping relationship with said ridge.

9. In a transport refrigeration unit of the type adapted to be mounted on the front wall of a trailer for conditioning the interior of the trailer, the unit having a structural frame which includes a section to be attached to the trailer and support members spaced from the front of the trailer for supporting the front and bottom covers for enclosing the refrigeration unit, a method of assembly comprising the steps of:
providing a rear horizontal support member having a plurality of laterally spaced tabs extending forwardly therefrom;
providing a front horizontal support member disposed substantially parallel to said rear horizontal support member;
providing a bottom, generally planar, cover having front and rear edges;
providing a plurality of upstanding pockets disposed near said rear edge, with each pocket having a slot formed in the back thereof, said pockets being transversely spaced at substantially the same spacing as said tabs; installing said bottom cover on said tabs such that each of said tabs is registered within a slot so as to support said cover at its rear edge;
providing a plurality of fastening pockets near said front edge; and
securing said fastening pockets to said front frame member by way of fasteners.

10. A transport refrigeration unit as set forth in claim 9 wherein said planar cover is composed of a plastic material.

11. A transport refrigeration unit as set forth in claim 10 wherein said plastic material is a thermoplastic olefin.

12. A method as set forth in claim 9 and including the step of providing a pair of obliquely extending support members for interconnecting the respective ends of rear horizontal support member and said front horizontal support member.

13. A method as set forth in claim 9 and including the step of securing a plurality of L brackets to a front face on said front frame member and securing said fastening pockets to said L brackets.

14. A method as set forth in claim 12 and including the steps of attaching an L bracket to the rear face of each of said obliquely extending support members and attaching a fastening pocket to each one of said L brackets.

15. A method as set forth in claim 9 and including the step of providing an upstanding ridge on said front and rear edges.

16. A method as set forth in claim 15 and including the step of installing a gasket in overlapping relationship with said ridge.

\* \* \* \* \*